United States Patent [19]

Siegmund

[11] Patent Number: 4,955,053
[45] Date of Patent: Sep. 4, 1990

[54] SOLID STATE RINGING SWITCH
[75] Inventor: Gary G. Siegmund, Elyria, Ohio
[73] Assignee: Reliance Comm/Tec Corporation, Chicago, Ill.
[21] Appl. No.: 496,068
[22] Filed: Mar. 16, 1990
[51] Int. Cl.⁵ .................................................. H04M 3/02
[52] U.S. Cl. ............................... 379/253; 379/255; 328/179; 328/21; 307/269
[58] Field of Search ............... 379/252, 253, 255, 254; 307/261, 269, 270; 328/13, 21, 179

[56] References Cited

U.S. PATENT DOCUMENTS

| | | | |
|---|---|---|---|
| 3,683,118 | 8/1972 | Vago et al. | 379/253 |
| 4,370,526 | 1/1983 | Schoofs et al. | 379/253 |
| 4,656,659 | 4/1987 | Chea, Jr. | 379/253 |
| 4,797,917 | 1/1989 | Pusetti et al. | 379/253 |

Primary Examiner—James L. Dwyer
Attorney, Agent, or Firm—Michael M. Rickin

[57] ABSTRACT

A ringing switch for providing ringing voltage and tripping voltage to the cable pairs of a telephone central office. The switch synchronizes the control signal from a cadence generator with the zero crossing of the ringing voltage to ensure that the voltage at the switch output changes from the ringing voltage to the tripping voltage or vice versa only when the ringing voltage crosses the tripping voltage. Field effect transistors are used to switch the ringing voltage and a silicon controlled rectifier is used to switch the tripping voltage.

15 Claims, 1 Drawing Sheet

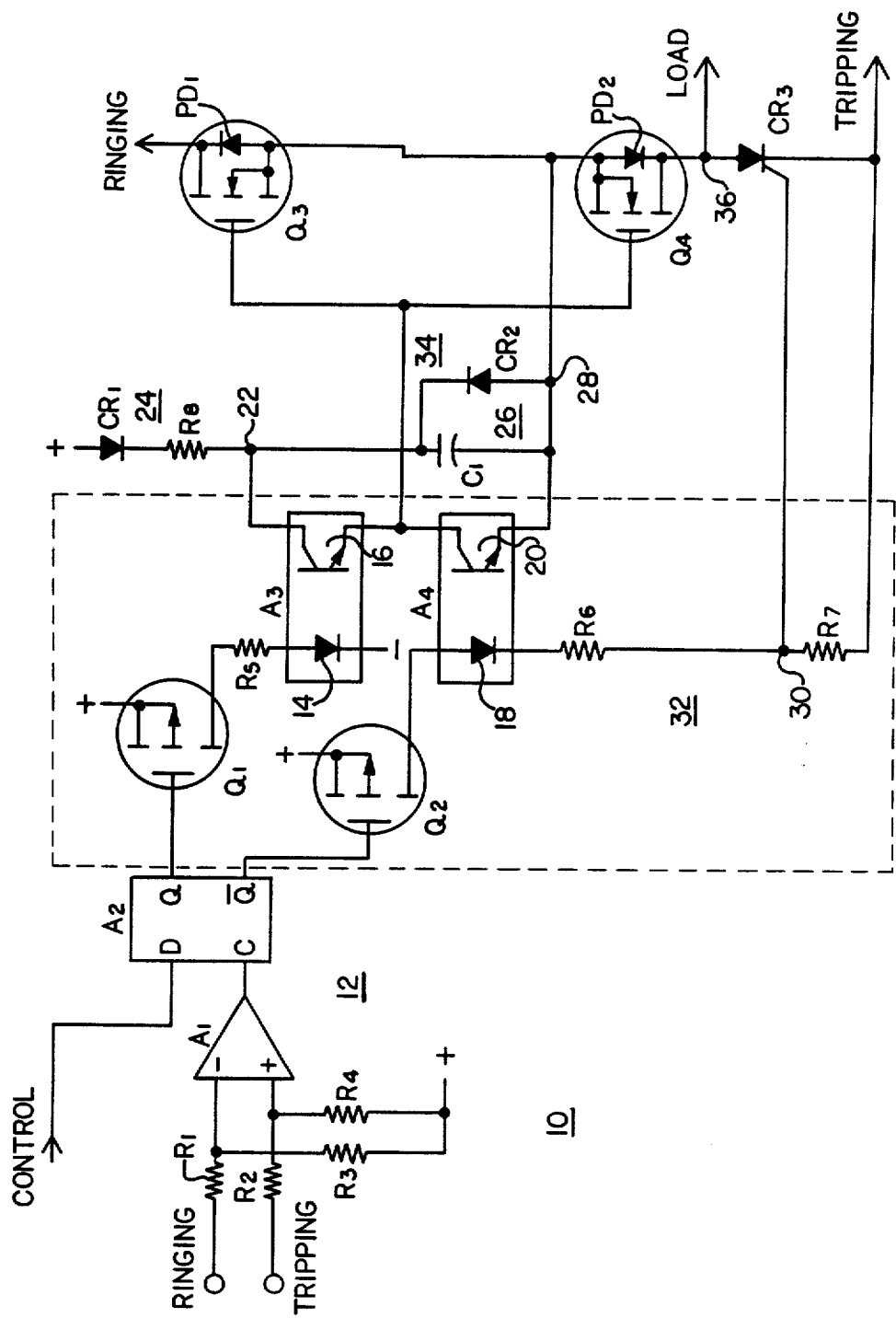

SOLID STATE RINGING SWITCH

This is a continuation of co-pending application Ser. No. 07/316,332 filed on Feb. 27, 1989, now abandoned.

BACKGROUND OF THE INVENTION

1. Field of the Invention

This invention relates to the switching between an AC ringing voltage and a DC trip voltage which occurs at many telephone company central offices and more particularly to a circuit which performs such switching.

2. Description of the Prior Art

A typical telephone central office provides service to a large number of subscribers who are connected to the office by cable pairs. The central office usually includes one or more generators each associated with a predetermined number of the subscribers served by the office. Each generator provides an AC signal or voltage for ringing the subscriber telephones. That AC signal is superimposed on the central office battery to give rise to a composite signal having both an AC and a DC component.

When it is desired to ring the telephones of the subscribers served by that office, the composite signal from the associated generator is applied to the appropriate cable pairs. The composite signal will be referred to hereinafter as the "ringing signal or ringing voltage".

The subscriber telephones are usually rung in a pattern. The ringing signal is applied to the cable pairs for a predetermined interval, typically two seconds. If at the end of that interval the called subscribers have not answered or the calling parties have not abandoned the call, the ringing voltage is removed from the cable pairs and central office battery also known as the quiet interval tripping voltage is applied to the cable pairs for a predetermined interval, typically four seconds. This pattern of applying ringing voltage followed by tripping voltage to the cable pairs continues until either the called subscriber answers or the calling party abandons the call.

Telephone operating companies must then include at the central office, equipment which switches back and forth between the ringing voltage and the tripping voltage. Various devices and circuit designs have been used in the past to accomplish that switching. Examples of such devices and circuit designs are:

(i) switching devices using electromechanical relays or rotary cam and spring interrupters;

(ii) switching circuits using bipolar transistors; and (iii) switching circuits using triacs and inverse parallel silicon controlled rectifiers (SCRs).

The switching devices which use electromechanical relays or rotary cam and spring interrupters may have the disadvantage of higher initial cost as compared to switching circuits which use solid state components. Those devices are unable to perform switching at the zero crossing of the ringing voltage. Such switching is desirable as it minimizes induced noise in adjacent central office cable pairs. Zero crossing is also important to avoid switching at the negative peak of the superimposed ringing and battery into a highly capacitive load such as tens to hundreds of subscriber cable pairs. Finally, such devices have a relatively short life due to progressive contact deterioration and eventual mechanical wearout. To limit the contact erosion of the switching device from highly reactive loads, the electromechanical devices must be oversized or multiple devices must be employed, each carrying a fraction of the total central office load.

The switching circuit designs which use bipolar transistors introduce undesirable distortion where ringback tone is superimposed on the ringing waveform. The superimposed ringback tone is the tone heard by the calling party during the interval when the subscriber's telephone is rung. The undesirable distortion is heard by the calling party as clicks and is due to the saturation voltage of the transistors. Those circuits which use triacs and inverse parallel SCRs also introduce distortion in the ringing waveform due to the voltage drop across the devices. In addition, care must be taken in designing circuits which use triacs and inverse parallel SCRs to insure proper device commutation.

As can be seen from the above discussion, it is desirable that a ringing switch use solid state rather than mechanical devices. It is further desirable that such a solid state switching circuit be easy to design, have true zero crossing switching and not introduce distortion where ringback tone is superimposed on the ringing waveform. None of the prior art switching units can meet all of these requirements. The solid state switch of the present invention does.

SUMMARY OF THE INVENTION

A switch which provides to a load a ringing signal for a predetermined time interval. The switch includes means for determining when the ringing signal crosses another signal in a predetermined direction and generating a signal indicative of that crossing.

The switch also includes means to synchronize the indicative signal to a periodic control signal which is representative of the predetermined ringing time interval. The synchronizing means generates a first output signal when the indicative signal occurs in the ringing time interval.

The switch further includes a first power output switching means which has a closed state. In the closed state, the first power output switching means has a substantially low and constant impedance and provides to the load the ringing signal.

The switch also further includes means which responds to the first output signal of the synchronizing means for generating from the ringing signal without introducing any perceptible distortion therein a signal for driving the first power output switching means into the closed state.

DESCRIPTION OF THE DRAWING

The only drawing FIGURE shows a schematic circuit diagram for one embodiment of the solid state ringing switch of the present invention.

DESCRIPTION OF THE PREFERRED EMBODIMENT

Referring now to the drawing figure, there is shown the schematic circuit diagram for one embodiment of the solid state ringing switch 10 of the present invention. Switch 10 includes zero crossing detector circuit 12 which is comprised of amplifier A1 and resistors R1, R2, R3 and R4. Amplifier A1 has its inverting input connected by resistor R1 to receive the ringing voltage and its noninverting input connected by resistor R2 to receive the tripping voltage. Resistor R3 connects the inverting input to a source of positive voltage while resistor R4 connects the noninverting input to the same source.

As previously described, the ringing voltage is a composite signal having both an AC and a DC component and the tripping voltage is the DC component of the ringing voltage. The output of circuit 12 changes state when the ringing voltage crosses the tripping voltage. For the embodiment shown in the figure for circuit 12, the output of A1 has a positive slope when the ringing voltage has crossed the tripping voltage in the negative direction.

A flip-flop A2 has its clock (C) input connected to the output of A1 and its data (D) input connected to receive a control signal for switch 10 from a cadence generator (not shown) located at the central office. The control signal changes polarity to indicate if switch 10 should be providing at its output 36 the ringing voltage or the tripping voltage to the load, i.e. the cable pairs. When the output signal from A1 goes positive, flip-flop A2 is clocked to change state dependent on the polarity of the control signal at the D input. As the output from A1 only goes positive when the ringing voltage crosses the tripping voltage in the negative direction, flip-flop A2 functions as a delay circuit to synchronize the control signal with the zero crossing of the ringing voltage. This sychronization of the control signal with the zero crossing of the ringing voltage ensures that switch 10 will change the voltage at its output only at the zero crossing.

The Q output of flip-flop A2 is connected to the gate electrode of field effect transistor (FET) Q1. The not Q output of flip-flop A2 is connected to the gate electrode of FET Q2. The source electrodes of both FETs are each connected to a positive voltage. The drain electrode of FET Q1 is connected by a resistor R5 to the anode of light emitting diode (LED) 14 which with phototransistor 16 comprises circuit A3. The cathode of LED 14 is connected to a negative voltage. The drain electrode of FET Q2 is connected to the anode of LED 18 which with phototransistor 20 comprises circuit A4. The cathode of LED 18 is connected by the series combination of resistors R6 and R7 to the tripping voltage input of switch 10.

The emitter of phototransistor 16 and the collector of phototransistor 20 are connected to each other and also are both connected to the gate electrodes of power FETs Q3 and Q4. The collector of phototransistor 16 is connected at junction 22 to the series circuit 24 of resistor R8 and diode CR1. Diode CR1 has its anode connected to a positive voltage. Junction 22, and therefore circuit 24 and the collector of transistor 16, is connected by the parallel circuit 26 of capacitor C1 and diode CR2 (poled as shown) to the junction 28 of the emitter of transistor 20 and the source electrodes of FETs Q3 and Q4.

The drain electrode of FET Q3 is connected to the ringing voltage input of switch 10. The drain electrode of FET Q4 is connected by silicon controlled rectifier (SCR) CR3 to the tripping voltage input of switch 10. The gate of SCR CR3 is connected to the junction 30 between resistors R6 and R7. The output voltage of switch 10 appears at the junction 36 of the drain electrode of FET Q4 and the anode of SCR CR3. When FETs Q3 and Q4 are on and SCR CR3 is off, that output voltage is the ringing voltage. When FETs Q3 and Q4 are off and SCR CR3 is on, that output voltage is the tripping voltage.

All power FETs have parasitic diodes which interconnect the source and drain electrodes of the FET. Those parasitic diodes, PD1 and PD2, associated with FETs Q3 and Q4, respectively, are shown in the drawing figure as they each provide the useful function (to be described hereinafter) in the operation of switch 10.

FETs Q3 and Q4 and SCR CR3 all function as switching power output devices. FETs Q1 and Q2 in combination with circuits A3 and A4, and resistors R5, R6 and R7 form the drive electronics 32 for controlling the power devices. Circuits A3 and A4 provide isolation between the inputs and outputs of the drive electronics 32. Diodes CR1 and CR2 in combination with resistor R8 and capacitor C1 form the power supply circuit 34 for the source electrodes of FETs Q3 and Q4.

As previously described, ringing switch 10 functions to provide both the ringing voltage and the tripping voltage to the cable pairs of the subscribers whose telephones are being rung. The period of time during which switch 10 provides the ringing voltage to the cable pair will be referred to hereinafter as the "ringing interval". The period of time during which switch 10 provides the tripping voltage to the cable pairs will be referred to hereinafter as the "tripping or quiet interval".

The operation of switch 10 will now be described. For purposes of this description, it will be assumed that the switch is operating in the ringing interval. During that interval, FET Q1 and circuit A3 are both on and FET Q2 and circuit A4 are both off. FETs Q3 and Q4 are both on and SCR CR3 is off. It is further assumed that the control signal at the D input to flip-flop A2 has just changed its polarity to that which will allow the next occurrence of a positive slope at the output of A1 to clock A2 to the state which terminates the ringing interval and starts the tripping interval.

During the ringing interval, the Q output of A2 is low as FET Q1 is turned on and the not Q output of A2 is high as FET Q2 is off. When A2 is next clocked by the ringing voltage crossing the tripping voltage in the negative direction, the Q output of A2 goes high and the not Q output of A2 goes low. FET Q1 is turned off and FET Q2 is turned on. As FET Q1 is turned off, circuit A3 is also turned off. As FET Q2 is turned on, circuit A4 is turned on and a current flows through resistor R6. The connection of the gate of SCR CR3 to junction 30 allows resistor R6 to supply a current to CR3 which turns the SCR on. With circuit A3 off and circuit A4 on, the FETs Q3 and Q4 are both biased off. Therefore, during the tripping interval FETs Q3 and Q4 are both off and SCR CR3 is on and switch 10 provides the tripping voltage to the load.

In order to indicate the end of the tripping interval and the beginning of the next ringing interval, the control signal changes polarity. When the output of A1 next goes positive, the flip-flop A2 is clocked to cause the Q output to go low and the not Q output to go high. FET Q1 is turned on and FET Q2 is turned off. The turning on of Q1 allows a current to flow through resistor R5 turning on LED 14 to thereby turn on circuit A3. The turning off of Q2 turns off circuit A4 and also removes the current from the gate of SCR CR3. The turning on of Q1 and A3 and the turning off of Q2 and A4 provides the gate electrode voltage to FETs Q3 and Q· turning on those FETs. The ringing voltage then appears at the output of switch 10 and also at the anode of CR3. As the start of the ringing interval resulted from the ringing voltage crossing the tripping voltage in a negative direction, CR3 is commutated off by its anode voltage going negative with the ringing voltage waveform. Therefore, during the ringing interval switch 10 provides the ringing voltage to the load.

The energy for power supply circuit 34 comes from either of the input voltages to switch 10 depending upon whether switch 10 is in the ringing interval, the tripping interval or in the start-up of the switch. Each are discussed below.

When switch 10 is in the ringing interval, FETs Q3 and Q4 are both on. The source electrode of both FETs are then at the ringing voltage. The voltage differential which exists between the source electrodes of the FETs and the anode of diode CR1 of supply 34 supplies voltage to charge up and maintain the voltage on supply capacitor C1.

When switch 10 is in the tripping interval, FETs Q3 and Q4 are off and SCR CR3 is on. Even through Q4 is off, its parasitic diode PD2 conducts and the source electrode of Q4 is at the tripping voltage. This also allows capacitor C1 to maintain its voltage.

During the initial start-up of switch 10, FETs Q3 and Q4 and SCR CR3 are all off. The parasitic diode PD1 of Q3 does, however, conduct when the ringing waveform is negative to ground. This conduction also enables capacitor C1 to maintain its voltage. Thus, power supply 34 will maintain voltage as long as ringing voltage is present even if switch 10 is in the start-up condition.

As described above, switching power output devices Q3 and Q4 have been embodied using FETs in order that certain characteristics exhibited by such devices can be advantageously used in switch 10.

FETs require negligible gate current in order to turn those devices on and maintain them on once they are turned on. As previously described, power supply circuit 34 obtains its energy either from the ringing or the tripping voltage depending on the operating condition of switch 10. Circuit 34 provides the power to drive the gate electrodes of FETs Q3 and Q4. As those devices require only negligible current at the gate electrode to both turn them on and maintain them on, supply circuit 34 can provide that current from the ringing voltage (both FETs are on in the ringing interval) without introducing any perceptible distortion in that voltage or excessively loading the ringing generator. If Q3 and Q4 were embodied by devices which required more than negligible current to both turn them on and maintain them on, then switch 10 could not provide that current from the ringing voltage without introducing perceptible distortion in that voltage due to an excessive unsymmetrical load. Switch 10 would then need a separate power supply such as a DC to DC converter to provide that current.

FETs turnoff when the drive current, i.e. the current into the FET gate electrode, is removed. They are self commutating devices. This is in contrast to devices such as triacs and SCRs which need a separate signal at their associated control electrode in order to turn them off when they are conducting. In switch 10, the clocking of flip-flop A2 to end the ringing interval and start the tripping interval turnsoff Q1 and therefore circuit A3, causing the cessation of drive current to Q3 and Q4. FETs Q3 and Q4 turnoff. Thus, in switch 10 the synchronization provided by A2 also turnsoff the FETs Q3 and Q4 when switch 10 changes from the ringing interval to the tripping interval.

When on, FETs appear to the circuit in which they are used as a resistor having a constant low resistance. Therefore in switch 10, when FETs Q3 and Q4 are on they each present a linear series resistive component to the ringing voltage waveform. Thus, the conduction of FETs Q3 and Q4 does not introduce any distortion in the ringing voltage.

In switch 10, switching power device CR3 which conducts during the tripping interval has been embodied using a SCR. While a SCR requires a signal at its gate electrode to turn it on, this does not present any problem in switch 10 as during the tripping interval the gate current essentially comes from the central office battery.

While the switching power output devices Q3 and Q4 of switch 10 have been embodied using FETs, it should be appreciated that Q3 and Q4 may be embodied by any switching power devices having the desirable characteristics described above for FETs. It should further be appreciated that those desirable characteristics allow switch 10 to use the ringing voltage during the ringing interval as the source of power for both turning on and keeping on those devices without introducing any perceptible distortion in that voltage. It should also be appreciated that those desirable characteristics allow switch 10 to turn those devices off without the need for additional and possibly complicated control circuitry. Finally, it should be appreciated that those desirable characteristics introduce no distortion in the ringing waveform when those devices are on, even if the current to their gate electrodes is provided from a separate source.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A switch for providing to a load a signal from an ac source for a predetermined time interval, said switch comprising:
  (a) means for determining when said ac signal crosses another signal in a predetermined direction and generating a signal indicative thereof;
  (b) means for synchronizing said indicative signal to a periodic control signal representative of said predetermined ac signal time interval and generating a first output signal when said indicative signal occurs in said predetermined ac signal time interval;
  (c) first power output switching means having a closed state which has a substantially constant and low impedance for providing said ac signal to said load;
  (d) supply means for generating from said ac signal without introducing any perceptible distortion therein a floating source of power; and
  (e) means responsive to said synchronizing means first output signal for using said floating source of power to drive said first power output means into said closed state.

2. The switch of claim 1 wherein said ac source is a ringing generator.

3. The switch of claim 1 wherein said switch also provides to said load for a predetermined time interval a dc signal and said switch further comprises:
  second power output switching means having a closed state for providing said dc signal to said load.

4. The switch of claim 3 wherein said ac source is a ringing generator and said another signal is said dc signal.

5. The switch of claim 4 wherein said periodic control signal is also representative of said predetermined dc time interval.

6. The switch of claim 1 wherein said means responsive to said synchronizing means first output signal is also responsive to said first output signal for using said floating source of power to maintain said first power output means in said closed state.

7. The switch of claim 1 wherein said substantially constant and low impedance of said first power output switching means is placed in series with said ac source.

8. A switch for alternately providing to a load a signal from a ringing generator for a predetermined time interval and a tripping signal for a predetermined time interval, said switch comprising:
 (a) means for determining when said ringing signal crosses said tripping signal in a predetermined direction and generating a signal indicative thereof;
 (b) means for synchronizing said indicative signal to a periodic control signal representative of said predetermined ringing time interval and generating a first output signal when said indicative signal occurs in said predetermined ringing time interval;
 (c) first power output switching means having a closed state which has a substantially constant and low impedance for providing said ringing signal to said load;
 (d) second power output switching means having a closed state for providing said tripping signal to said load; and
 (e) means responsive to said synchronizing means first output signal for generating from said ringing signal without introducing any perceptible distortion therein a signal for driving said first power output means into said closed state.

9. The switch of claim 8 wherein said means responsive to said synchronizing means first output signal is also responsive to said first output signal for generating from said ringing signal without introducing any perceptible distortion therein a signal for maintaining said first power output means in said closed state.

10. The switch of claim 9 wherein said periodic control signal is also representative of said predetermined tripping time interval and said synchronizing means terminates said first output signal when said indicative signal occurs in said predetermined tripping time interval.

11. The switch of claim 10 wherein said synchronizing means generates a second output signal when said indicative signal occurs in said predetermined tripping time interval and said means responsive to said synchronizing means first output signal is also responsive to said second output signal for generating from said tripping signal a signal for driving said second power output means into said closed state.

12. A switch for alternately providing to a load a signal from a ringing generator for a predetermined time interval and a tripping signal for a predetermined time interval, said switch comprising:
 (a) means for determining when said ringing signal crosses said tripping signal in a predetermined direction and generating a signal indicative thereof;
 (b) means for synchronizing said indicative signal to a periodic control signal representative of said preedetermined ringing time interval and generating a first output signal when said indicative signal occurs in said predetermined ringing time interval;
 (c) first power output switching means having a closed state which places a substantially constant and low impedance in series with said ringing generator for providing said ringing signal to said load;
 (d) second power output switching means having a closed state for providing said tripping signal to said load; and
 (e) means responsive to said synchronizing means first output signal for generating from said ringing signal without introducing any perceptible distortion therein a signal for driving said first power output means into said closed state.

13. The switch of claim 12 wherein said means responsive to said synchronizing means first output signal is also responsive to said first output signal for generating from said ringing signal without introducing any perceptible distortion therein a signal for maintaining said first power output means in said closed state.

14. The switch of claim 13 wherein said periodic control signal is also representative of said predetermined tripping time interval and said synchronzing means terminates said first output signal when said indicative signal occurs in said predetermined tripping time interval.

15. The switch of claim 14 wherein said synchronizing means generates a second output signal when said indicative signal occurs in said predetermined tripping time interval and said means responsive to said synchronizing means first output signal is also responsive to said second output signal for generating from said tripping signal a signal for driving said second power output means into said closed state.

* * * * *